(12) United States Patent
Hollmann et al.

(10) Patent No.: US 11,991,359 B2
(45) Date of Patent: *May 21, 2024

(54) METHOD AND APPARATUS FOR SELECTING TRANSFORM SELECTION IN AN ENCODER AND DECODER

(71) Applicant: Telefonaktiebolaget LM Ericsson (publ), Stockholm (SE)

(72) Inventors: Christopher Hollmann, Uppsala (SE); Davood Saffar, Solna (SE); Jacob Ström, Stockholm (SE); Per Wennersten, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,414

(22) Filed: Dec. 8, 2022

(65) Prior Publication Data
US 2023/0109113 A1 Apr. 6, 2023

Related U.S. Application Data

(63) Continuation of application No. 17/360,088, filed on Jun. 28, 2021, now Pat. No. 11,558,613, which is a continuation of application No. 16/640,010, filed as application No. PCT/SE2019/051206 on Nov. 28, 2019, now Pat. No. 11,082,692.

(Continued)

(51) Int. Cl.
*H04N 19/12* (2014.01)
*H04N 19/13* (2014.01)
*H04N 19/147* (2014.01)
*H04N 19/176* (2014.01)
*H04N 19/46* (2014.01)

(52) U.S. Cl.
CPC ............. *H04N 19/12* (2014.11); *H04N 19/13* (2014.11); *H04N 19/147* (2014.11); *H04N 19/176* (2014.11); *H04N 19/46* (2014.11)

(58) Field of Classification Search
CPC ...... H04N 19/12; H04N 19/13; H04N 19/147; H04N 19/176; H04N 19/46; H04N 19/60; H04N 19/70; H04N 19/625; H04N 19/119
See application file for complete search history.

(56) References Cited

U.S. PATENT DOCUMENTS

| 10,924,736 B2 | 2/2021 | Koo et al. |
| 2012/0140813 A1 | 6/2012 | Sole Rojals et al. |

(Continued)

FOREIGN PATENT DOCUMENTS

| CN | 107534780 A | 1/2018 |
| CO | 2019/0013898 A2 | 1/2020 |

(Continued)

OTHER PUBLICATIONS

International Search Report and Written Opinion of the International Searching Authority for International Application No. PCT/SE2019/051206 dated Feb. 20, 2020.

(Continued)

*Primary Examiner* — Dramos Kalapodas
(74) *Attorney, Agent, or Firm* — Sage Patent Group

(57) ABSTRACT

There are provided mechanisms for methods and apparatuses for transform selection in encoding and decoding of video blocks.

22 Claims, 9 Drawing Sheets

Related U.S. Application Data

(60) Provisional application No. 62/785,856, filed on Dec. 28, 2018.

(56) References Cited

U.S. PATENT DOCUMENTS

| | | | |
|---|---|---|---|
| 2012/0140814 | A1 | 6/2012 | Sole Rojals et al. |
| 2012/0163448 | A1 | 6/2012 | Zheng et al. |
| 2012/0163469 | A1 | 6/2012 | Kim et al. |
| 2012/0163472 | A1 | 6/2012 | Sole Rojals et al. |
| 2013/0022125 | A1 | 1/2013 | Sato |
| 2013/0051453 | A1 | 2/2013 | Sole et al. |
| 2013/0188699 | A1 | 7/2013 | Joshi et al. |
| 2013/0272378 | A1 | 10/2013 | Sole Rojals et al. |
| 2013/0343448 | A1 | 12/2013 | He et al. |
| 2016/0219290 | A1* | 7/2016 | Zhao ............... H04N 19/136 |
| 2017/0164000 | A1 | 6/2017 | Sasai et al. |
| 2017/0251224 | A1 | 8/2017 | Lee et al. |
| 2018/0020218 | A1 | 1/2018 | Zhao et al. |
| 2018/0035123 | A1 | 2/2018 | Wennersten et al. |
| 2018/0262763 | A1 | 9/2018 | Seregin et al. |
| 2018/0332289 | A1* | 11/2018 | Huang ............... H04N 19/96 |
| 2018/0367814 | A1 | 12/2018 | Seregin et al. |
| 2019/0007705 | A1 | 1/2019 | Zhao et al. |
| 2019/0052876 | A1 | 2/2019 | Lee et al. |
| 2019/0103252 | A1 | 4/2019 | Kakehi et al. |
| 2019/0306521 | A1 | 10/2019 | Zhao et al. |
| 2020/0084447 | A1 | 3/2020 | Zhao et al. |
| 2021/0211727 | A1* | 7/2021 | Salehifar ............ H04N 19/12 |

FOREIGN PATENT DOCUMENTS

| | | |
|---|---|---|
| EP | 2618575 A2 | 7/2013 |
| JP | 2013522957 A | 6/2013 |
| RU | 2608244 C2 | 1/2017 |
| WO | 2018128222 A1 | 7/2018 |
| WO | 2019026807 A1 | 2/2019 |
| WO | 2019230670 A1 | 12/2019 |

OTHER PUBLICATIONS

Mischa Siekmann et al., "CE6—related: "Set of Transforms" selection and signaling scheme tested with different types of secondary transforms sets," Document: JVET-K0306-v2, Joint Video Experts Team (JVET) of ITU-T SG 16 WP 3 and ISO/IEC JTC 1/SC 29/WG 11, 11th Meeting: Ljubljana, SI, Jul. 10-18, 2018, 9 pages.

Jani Lainema, "CE6-related: Shape adaptive transform selection," Document: JVET-L0134-v2, Joint Video Experts Team (JVET) of ITU-T SG 16 WP 3 and ISO/IEC JTC 1/SC 29/WG 11, 12th Meeting: Macao, CN, Oct. 3-12, 2018, 6 pages.

Christopher Hollmann et al., "CE6-related: Transform Simplification," Document: JVET-L0489-v1, Joint Video Experts Team (JVET) of ITU-T Sg 16 WP 3 and ISO/IEC JTC 1/SC 29/WG 11, 12th Meeting: Macau, CN, Oct. 3-12, 2018, 6 pages.

Xin Zhao et al., "CE6-3.1: Coupled primary and 1-26 secondary transform," Document: JVET-K0085-v1, Joint Video Experts Team (JVET) of ITU-T SG 16 WP 3 and ISO/IEC JTC 1/SC 29/WG 11, 11th Meeting: Ljubljana, SI, Jul. 10-18, 2018, 5 pages.

Christopher Hollmann et al., "CE-6 related: Transform Simplification," Document: JVET-M0366-v5, Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.

Christopher Hollmann et al., "CE6: Transform Simplification (CE6-2.3a-c)," Document: JVET-N0490-r2, Joint Video Experts Team (JVET) of ITU-T SG 16 WP 3 and ISO/IEC JTC 1/SC 29/WG 11, 14th Meeting: Geneva, CH, Mar. 19-27, 2019, 7 pages.

Christopher Hollmann et al., "CE6-related: Transform Candidate Ordering," Document: JVET-N0491-r2, Joint Video Experts Team (JVET) of ITU-T SG 16 WP 3 and ISO/IEC JTC 1/SC 29/WG 11, 14th Meeting: Geneva, CH, Mar. 19-27, 2019, 7 pages.

Christopher Hollmann et al., "Non-CE6: Reduced MTS," Document: JVET-O0446-v3, Joint Video Experts Team (JVET) of ITU-T SG 16 WP 3 and ISO/IEC JTC 1/SC 29/WG 11, 15th Meeting: Gothenburg, SE, Jul. 3-12, 2019, 5 pages.

Sullivan et al., "Meeting Report of the 11th meeting of the Joint Video Experts Team (JVET)," Joint Video Experts Team (JVET) of ITU-T SG 16 WP 3 and ISO/IEC JTC 1/SC 29/WG 11, Ljubljana, SI, Jul. 10-18, 2018, Document: JVET-K1000-v1, 290 pages.

Bossen et al., "JVET common test conditions and software reference configurations for SDR video," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L1010-v1, 5 pages.

European Search Report and Search Opinion Communication for European Patent Application No. 19902876.2 dated Aug. 22, 2022.

Karam Naser, "CE6-related: Removed MTS CU-Flag and Reduced MTS Pairs," Document: JVET-L0264-v1, Joint Video Experts Team (JVET) of ITU-T SG 16 WP 3 and ISO/IEC JTC 1/SC 29/WG 11, 12th Meeting: Macao, CN, Oct. 3-12, 2018, 4 pages.

Jianle Chen, "Algorithm description for Versatile Video Coding and Test Model 2 (VTM 2)," Document: JVET-K1002-2, Joint Video Experts Team (JVET) of ITU-T SG 16 WP 3 and ISO/IEC JTC 1/SC 29/WG 11, 11th Meeting: Ljubljana, SI, Jul. 10-18, 2018, 21 pages.

Office Action, including English translation, for Russian Patent Application No. 2021122027/07(046081) dated Sep. 13, 2021.

Office Action including English translation for Colombian Application No. NC2021/0009769 dated Dec. 29, 2023, 14 pages.

Notice of Allowance for Chinese Patent Application No. 201980086072.3 dated Feb. 21, 2024, 7 pages.

\* cited by examiner

METHOD AND APPARATUS FOR SELECTING TRANSFORM SELECTION IN AN ENCODER AND DECODER

CROSS REFERENCE TO RELATED APPLICATIONS

This application is a continuation application of U.S. patent application Ser. No. 17/360,088 filed Jun. 28, 2021, which itself is a continuation application of U.S. patent application Ser. No. 16/640,010 filed Feb. 18, 2020 (now U.S. Pat. No. 11,082,692), which is a 35 U.S.C. § 371 national stage application of PCT International Application No. PCT/SE2019/051206 filed Nov. 28, 2019, which itself claims priority to U.S. Provisional Application No. 62/785,856 filed Dec. 28, 2018, the disclosure and content of each of which are incorporated herein by reference in their entireties.

TECHNICAL FIELD

The application relates to methods and apparatuses for transform selection in encoding and decoding.

BACKGROUND

The current test model VTM of the video codec under standardization Versatile Video Coding (VVC) includes a tool called Multiple Transform Selection (MTS). This tool allows an encoder to choose between three different transforms. These transforms consist of two variants of a Discrete Cosine Transformation (DCT) and one variant of a Discrete Sine Transformation (DST). During encoding, a transform is typically performed in the horizontal direction of the block, followed by a second transform in the vertical direction. These two transforms are independent of each other, so it is very much possible to use different transforms in different directions. The set of transforms that can be selected from includes DCT-2, DST-7 and DCT-8 [2].

The encoder tests all allowed combinations when selecting a transform to use. These are dependent on block type (inter/intra), block size, channel type and prediction mode. For example, for intra blocks in the luma channel with sizes between 4×4 samples and 32×32 samples, five different combinations are tested:

1. DCT-2 horizontal and DCT-2 vertical
2. DST-7 horizontal and DST-7 vertical
3. DST-7 horizontal and DCT-8 vertical
4. DCT-8 horizontal and DST-7 vertical
5. DCT-8 horizontal and DCT-8 vertical Blocks that are larger or in the chroma channel use only the DCT-2 in both directions. The tool can be enabled separately for intra and inter prediction. In the Common Test Conditions (CTC) [1] the tool is only enabled for intra predicted blocks. When the tool is disabled, the encoder uses the DCT-2 in both directions.

To reduce the number of bits needed to code the chosen combination, an arithmetic coder with adaptive probabilities may be used (Context-Adaptive Binary Arithmetic Coding, CABAC). The coder uses different contexts, each indicating a separate probability, to encode bins in the most efficient way. In the bit stream the combination chosen by the encoder is signaled as follows:

emt_cu_flag: 1 bin using 6 CABAC contexts to signal whether DCT-2 is used both horizontally and vertically. The context is chosen based on the split depth of the current block. The flag is only signaled for luma blocks with sizes between 4×4 and 32×32 samples, and only if MTS is allowed for the current prediction mode. If the value of the flag is 0, the DCT-2 is used, otherwise the emt_tu_idx is used to determine the combination of transforms.

emt_tu_idx: 2 bins using 4 CABAC contexts to signal which of the remaining four combinations is used. Two contexts are used if the block is intra-coded, while the remaining 2 contexts are used for inter-coded blocks. (In the CTC, these last two contexts are not used since MTS is turned off for inter coding in the CTC.) One context is used per bin, so the first bin uses context 0 or 2 (depending on the prediction mode), whereas the second bin always uses context 1 or 3. The possible values for these two bins range from 0 (00, indicating DST-7 in both directions) to 3 (11, indicating DCT-8 in both directions). These two bins are only signaled if the emt_cu_flag has the value 1.

In the decoder, a corresponding process is carried out. First, the emt_cu_flag is parsed.lf the flag is set, the emt_tu_idx is parsed to determine the transform to be used.

Note that in some cases, the names EMT (Explicit Multiple-core Transform) or AMT (Adaptive Multicore Transform) are used for the transform tool. These were previous names of the tool, which has since been changed to MTS. As all names refer to the same tool, they may be used interchangeably.

The current draft of the VVC standard performs an exhaustive search through all possible combinations. This results in the encoder spending a lot of time on testing different modes, some of which are very unlikely to be chosen. Furthermore, the binary coder uses an inefficient way to signal the transform index.

SUMMARY

A first aspect of the embodiments defines a method performed by a decoder. The method comprises receiving an encoded video block having at least one flag encoded using context-based adaptive arithmetic coding. The method comprises parsing at least one flag to determine if the at least one flag is set to signal that a first transform of a plurality of transforms is to be used to decode the encoded video block in both a horizontal direction and a vertical direction. Responsive to the at least one flag being set to signal that the first transform is to be used in both the horizontal direction and in the vertical direction, the method further comprises decoding the encoded video block is decoded in the horizontal direction and the vertical direction using the first transform to generate a decoded video block. Responsive to the at least one flag being set to signal that the first transform is not to be used in both the horizontal direction and in the vertical direction, the method comprises parsing a second flag of the at least one flag to determine if the second flag is set to signal a second transform of the plurality of transforms is to be used to decode the encoded video block in both a horizontal direction and a vertical direction to generate the decoded video block. Responsive to the second flag being set to signal that the second transform is to be used in both the horizontal direction and in the vertical direction, the method comprises decoding the encoded video block in the horizontal direction and the vertical direction using the second transform to generate the decoded video block. Responsive to the second flag being set to signal that the second transform is not to be used in both the horizontal direction and in the vertical direction, the method comprises parsing a third flag of the at least one flag to determine in which of the horizontal direction or the vertical direction the second transform is to be used to decode the encoded video block and in which of the horizontal direction or the vertical direction a third transform is to be used to decode the encoded video block. The method comprises decoding the encoded video block using the second and third transforms to generate the decoded video block.

A second aspect of the embodiments defines a decoder comprising at least one processor and a memory coupled to the processor. The memory comprises instructions executable by the processor, which cause the processor to perform receiving an encoded video block having at least one flag encoded using context-based adaptive arithmetic coding. The memory comprises instructions executable by the processor, which cause the processor to perform parsing the at least one flag to determine if the at least one flag is set to signal that a first transform of a plurality of transforms is to be used to decode the encoded video block in both a horizontal direction and a vertical direction. The memory comprises instructions executable by the processor, which cause the processor to perform, responsive to the at least one flag being set to signal that the first transform is to be used in both the horizontal direction and in the vertical direction, decoding the encoded video block in the horizontal direction and the vertical direction using the first transform to generate a decoded video block. The memory comprises instructions executable by the processor, which cause the processor to perform, responsive to the at least one flag being set to signal that the first transform is not to be used in both the horizontal direction and in the vertical direction, parsing a second flag of the at least one flag to determine if the second flag is set to signal a second transform of the plurality of transforms is to be used to decode the encoded video block in both a horizontal direction and a vertical direction to generate the decoded video block. The memory comprises instructions executable by the processor, which cause the processor to perform, responsive to the at least one flag being set to signal that the first transform is to be used in both the horizontal direction and in the vertical direction, decoding the encoded video block in the horizontal direction and the vertical direction using the second transform to generate the decoded video block. The memory comprises instructions executable by the processor, which cause the processor to perform, responsive to the at least one flag being set to signal that the first transform is not to be used in both the horizontal direction and in the vertical direction, parsing a third flag of the at least one flag to determine in which of the horizontal direction or the vertical direction the second transform is to be used to decode the encoded video block and in which of the horizontal direction or the vertical direction a third transform is to be used to decode the encoded video block. The memory comprises instructions executable by the processor, which cause the processor to perform decoding the encoded video block using the second and third transforms to generate the decoded video block.

A third aspect of the embodiments defines a computer program for a decoder. The computer program comprises code means which, when run on a computer, causes the computer to receive an encoded video block having at least one flag encoded using context-based adaptive arithmetic coding. The computer program comprises code means which, when run on a computer, causes the computer to parse at least one flag to determine if the at least one flag is set to signal that a first transform of a plurality of transforms is to be used to decode the encoded video block in both a horizontal direction and a vertical direction. The computer program comprises code means which, when run on a computer, causes the computer to, responsive to the at least one flag being set to signal that the first transform is to be used in both the horizontal direction and in the vertical direction, decode the encoded video block is decoded in the horizontal direction and the vertical direction using the first transform to generate a decoded video block. The computer program comprises code means which, when run on a computer, causes the computer to, responsive to the at least one flag being set to signal that the first transform is not to be used in both the horizontal direction and in the vertical direction, parse a second flag of the at least one flag to determine if the second flag is set to signal a second transform of the plurality of transforms is to be used to decode the encoded video block in both a horizontal direction and a vertical direction to generate the decoded video block. The computer program comprises code means which, when run on a computer, causes the computer to, responsive to the second flag being set to signal that the second transform is to be used in both the horizontal direction and in the vertical direction, decode the encoded video block in the horizontal direction and the vertical direction using the second transform to generate the decoded video block. The computer program comprises code means which, when run on a computer, causes the computer to, responsive to the second flag being set to signal that the second transform is not to be used in both the horizontal direction and in the vertical direction, parse a third flag of the at least one flag to determine in which of the horizontal direction or the vertical direction the second transform is to be used to decode the encoded video block and in which of the horizontal direction or the vertical direction a third transform is to be used to decode the encoded video block. The computer program comprises code means which, when run on a computer, causes the computer to decode the encoded video block using the second and third transforms to generate the decoded video block.

A fourth aspect of the embodiments defines a computer program product comprising computer readable means and a computer program according to the third aspect, stored on the computer readable means.

A fifth aspect of the embodiments defines a method performed by an encoder. The method comprises receiving a video block for encoding. The method comprises determining a characteristic of the video block. The method further comprises, responsive to the characteristic being of a type that indicates a multiple transform selection is used, selecting a first transform in a plurality of transforms that is part of the multiple transform selection and that is one of most computationally expensive to use or least likely to be used in encoding the video block. The method comprises testing combinations of the plurality of transforms in a horizontal direction and a vertical direction without testing a combination where the first transform is used in both the horizontal direction and the vertical direction. The method comprises selecting a combination from the combinations that provides the lowest rate distortion. The method comprises encoding the video block using the selected combination to generate an encoded video block. The method comprises, responsive to the characteristic being of a type that indicates a multiple transform selection is not to be used, encoding the video block using a default transform in the horizontal direction and the vertical direction.

A sixth aspect of the embodiments defines an encoder for encoding a block of video based on a block size of the block, wherein each of a horizontal direction and a vertical direction of the block is encoded using a transform, wherein the transform can be one of a first transform, a second transform or a third transform. The encoder comprises at least one processor and a memory coupled to the processor. The memory comprises instructions executable by the processor, which cause the processor to perform determining a characteristic of the video block. The memory comprises instructions executable by the processor, which cause the processor to perform, responsive to the characteristic being of a type that indicates a multiple transform selection is used, selecting a first transform in a plurality of transforms that is part of the multiple transform selection and that is one of most computationally expensive to use or least likely to be used in encoding the video block. The memory comprises instructions executable by the processor, which cause the processor to perform testing combinations of the plurality of transforms in a horizontal direction and a vertical direction without testing a combination where the first transform is used in both the horizontal direction and the vertical direction. The memory comprises instructions executable by the processor, which cause the processor to perform selecting a combination from the combinations that provides the lowest rate distortion. The memory comprises instructions executable by the processor, which cause the processor to perform encoding the video block using the selected combination to generate an encoded video block. The memory comprises instructions executable by the processor, which cause the processor to perform, responsive to the characteristic being of a type that indicates a multiple transform selection is not to be used, encoding the video block using a default transform in the horizontal direction and the vertical direction.

A seventh aspect of the embodiments defines a computer program
for encoding a block of video based on a block size of the block, wherein each of a horizontal direction and a vertical direction of the block is encoded using a transform, wherein the transform can be one of a first transform, a second transform or a third transform. The computer program comprises code means which, when run on a computer, causes the computer to determine a characteristic of the video block. The computer program comprises code means which, when run on a computer, causes the computer to, responsive to the characteristic being of a type that indicates a multiple transform selection is used, select a first transform in a plurality of transforms that is part of the multiple transform selection and that is one of most computationally expensive to use or least likely to be used in encoding the video block. The computer program comprises code means which, when run on a computer, causes the computer to test combinations of the plurality of transforms in a horizontal direction and a vertical direction without testing a combination where the first transform is used in both the horizontal direction and the vertical direction. The computer program comprises code means which, when run on a computer, causes the computer to select a combination from the combinations that provides the lowest rate distortion. The computer program comprises code means which, when run on a computer, causes the computer to encoding the video block using the selected combination to generate an encoded video block. The computer program comprises code means which, when run on a computer, causes the computer to, responsive to the characteristic being of a type that indicates a multiple transform selection is not to be used, encode the video block using a default transform in the horizontal direction and the vertical direction.

An eighth aspect of the embodiments defines a computer program product comprising computer readable means and a computer program according to the seventh aspect, stored on the computer readable means.

The advantages provided by the inventive concepts include reducing the encoder complexity by removing one of the five combinations described above. Both encoder and decoder complexity are reduced by using a less complex transform for certain block sizes. Furthermore, the efficiency of the binarization is increased as the number of bins for the most common combination (DST-7 in both directions) is reduced from 3 to 2.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
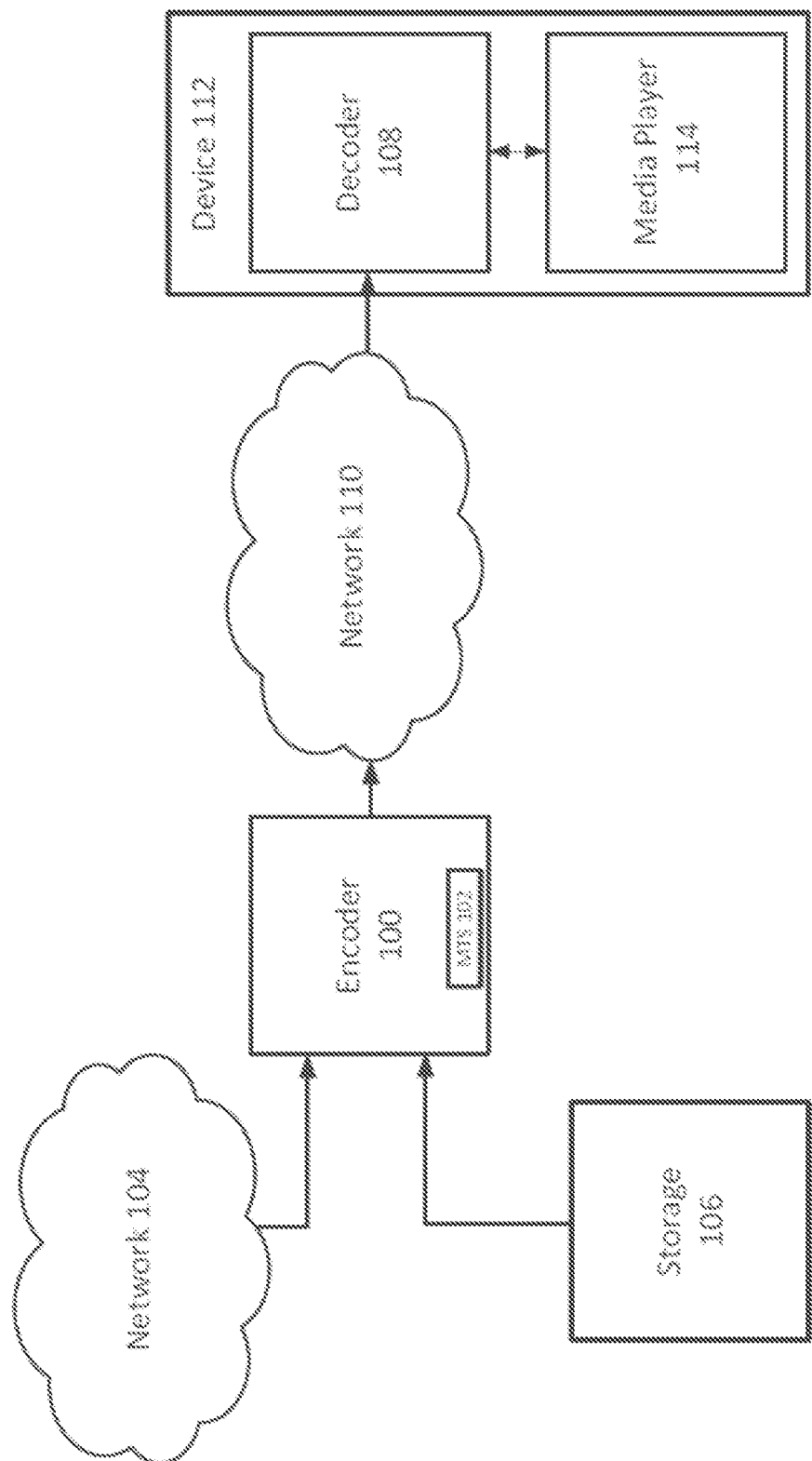
FIG. 1 is a block diagram illustrating an example of an environment of a system in which the encoder and decoder may be implemented according to some embodiments.

FIG. 1 illustrates an example of an operating environment of an encoder 100 that may be used to encode bitstreams as described herein. The encoder 100 has a multiple transform selection (MTS) component 102 used in encoding. The encoder 100 receives video from network 104 and/or from storage 106 and encodes the video into bitstreams using MTS component 102 for defined block sizes of the video as described below and transmits the encoded video to decoder 108 via network 110. Storage device 106 may be part of a storage depository of videos such as a storage repository of a store or a streaming video service, a separate storage component, a component of a mobile device, etc. The decoder 108 may be part of a device 112 having an audio/ video (NV) media player 114. The device 112 may be a mobile device, a set-top device, a desktop computer, and the like.

Figure 2:
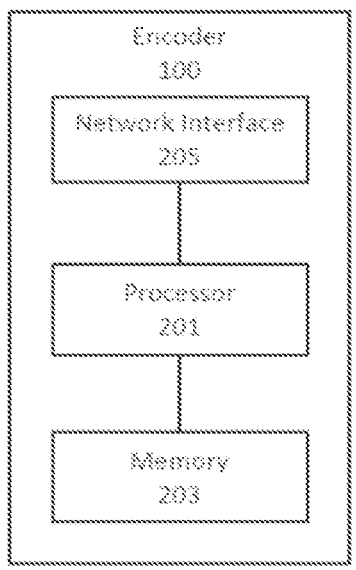
FIG. 2 is a block diagram is a block diagram illustrating an encoder according to some embodiments.

FIG. 2 is a block diagram illustrating elements of encoder 100 configured to encode video frames according to some embodiments of inventive concepts. As shown, encoder 100 may include a network interface circuit 205 (also referred to as a network interface) configured to provide communications with other devices/entities/functions/etc. The encoder 100 may also include a processor circuit 201 (also referred to as a processor) coupled to the network interface circuit 205, and a memory circuit 203 (also referred to as memory) coupled to the processor circuit. The memory circuit 203 may include computer readable program code that when executed by the processor circuit 201 causes the processor circuit to perform operations according to embodiments disclosed herein.

According to other embodiments, processor circuit 201 may be defined to include memory so that a separate memory circuit is not required. As discussed herein, operations of the encoder 100 may be performed by processor 201 and/or network interface 205. For example, processor 201 may control network interface 205 to transmit communications to decoder 108 and/or to receive communications through network interface 104 from one or more other network nodes/entities/servers such as other encoder nodes, depository servers, etc. Moreover, modules may be stored in memory 203, and these modules may provide instructions so that when instructions of a module are executed by processor 201, processor 201 performs respective operations.

Figure 3:
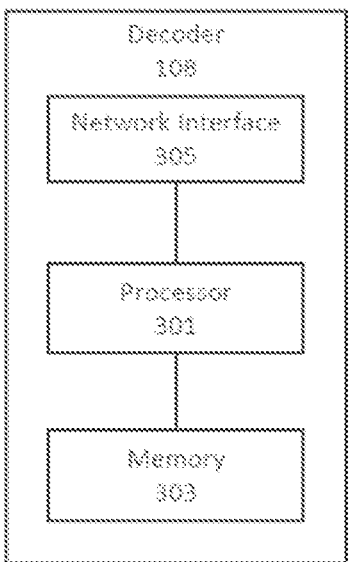
FIG. 3 is a block diagram illustrating a decoder according to some embodiments.

FIG. 3 is a block diagram illustrating elements of decoder 108 configured to decode video frames according to some embodiments of inventive concepts. As shown, decoder 108 may include a network interface circuit 305 (also referred to as a network interface) configured to provide communications with other devices/entities/functions/etc. The decoder 108 may also include a processor circuit 301 (also referred to as a processor) coupled to the network interface circuit 305, and a memory circuit 303 (also referred to as memory) coupled to the processor circuit. The memory circuit 303 may include computer readable program code that when executed by the processor circuit 301 causes the processor circuit to perform operations according to embodiments disclosed herein.

According to other embodiments, processor circuit 301 may be defined to include memory so that a separate memory circuit is not required. As discussed herein, operations of the decoder 108 may be performed by processor 301 and/or network interface 305. For example, processor 301 may control network interface 305 to receive communications from encoder 100. Moreover, modules may be stored in memory 303, and these modules may provide instructions so that when instructions of a module are executed by processor 301, processor 301 performs respective operations.

A potential advantage provided by the inventive concepts described herein include reducing the encoder run time by limiting the number of transform combinations to be evaluated in the case of an encoder implemented in software. In the case of an encoder implemented in hardware, the complexity reduction may take another form, such as lowered silicon area usage instead of encoder run time.

The embodiments described herein reduce the complexity of both the encoder and decoder by replacing a transform that is computationally expensive to use or that is infrequently used by another transform for certain block sizes. For example, in an encoder that is configured to operate under the VVC standard, the DCT-8, which is relatively speaking computationally expensive, may be replaced by the DCT-2, which is relatively speaking less computationally expensive, for certain block sizes.

Furthermore, the compression efficiency is increased by using CABAC contexts to binarize emt_cu_flag and emt_tu_idx.

A further improvement is a reduction in memory usage as no transform coefficients for the transform replaced (e.g., size-32 DCT-8) have to be stored in the memory. In a hardware implementation this may translate to a smaller silicon surface area.

For example, in an implementation based on an anchor using VTM-2.0.1 according to the Common Test Conditions (CTC) as described in [1], the compression efficiency (average BD-rate for luma) is improved by 0.07% in the All Intra configuration and 0.02% in the Random Access (RA) configuration. At the same time, the encoding time is reduced to 85% (AI) and 95% (RA), respectively, compared to the anchor. There is minimal, if any, impact on the complexity of the decoder, but to the extent that is impact, it is favorable. One reason for this is due to the computationally expensive combination of DCT-8 horizontally and DCT-8 vertically being removed from use. When implementing the same modifications in VTM-3.0, the improvements in compression efficiency are 0.03% (AI) and 0.01% (RA), while the encoder run time is reduced to 88% (AI) and 98% (RA), respectively.

In the description that follows, an encoder and decoder configured to perform in accordance with portions of the VVC standardization is used to describe the inventive concepts. Other standardizations may be implemented using the concepts described herein.

Figure 4:
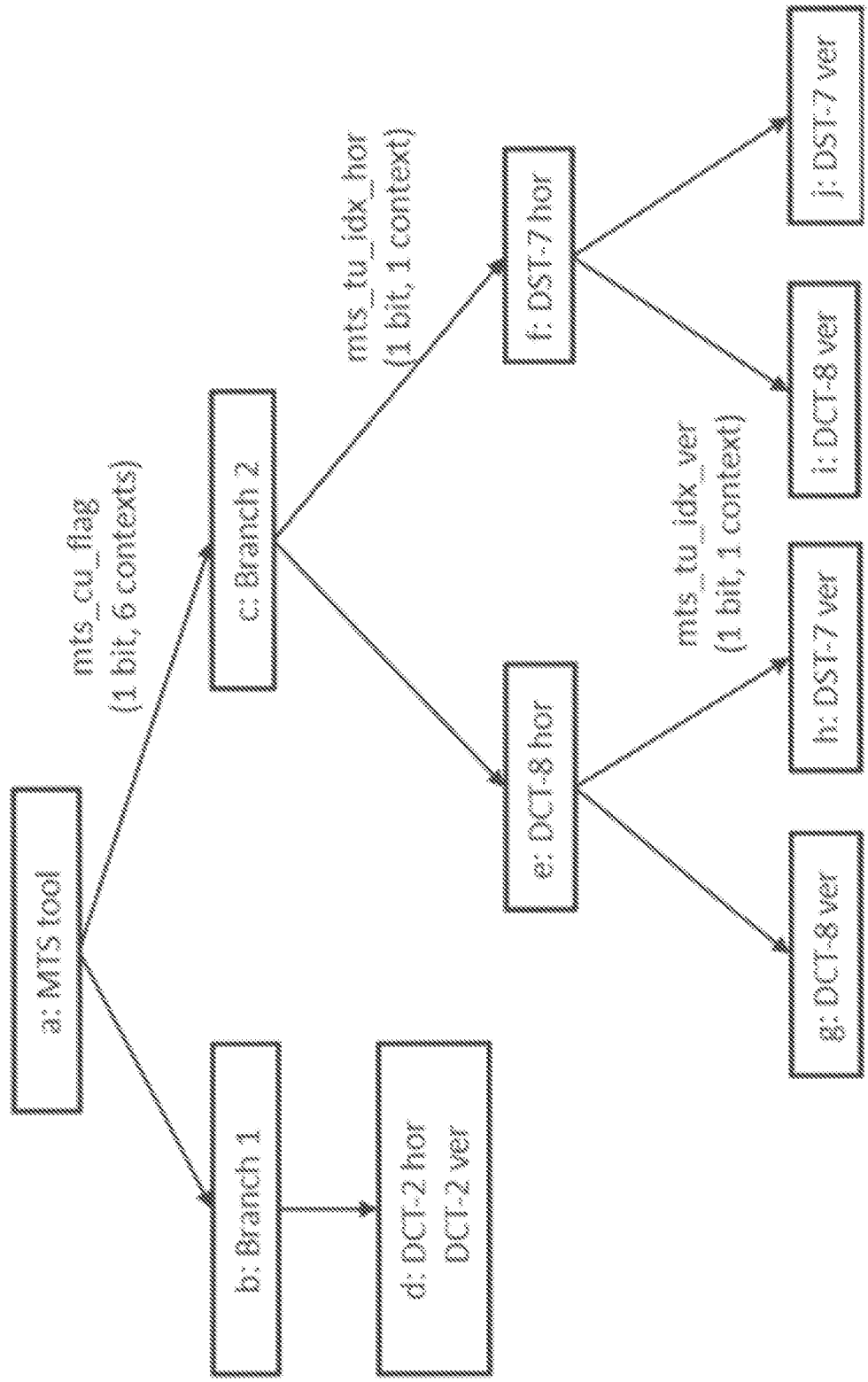
FIG. 4 is a block diagram illustrating components of a MTS tool.
Figure 5:
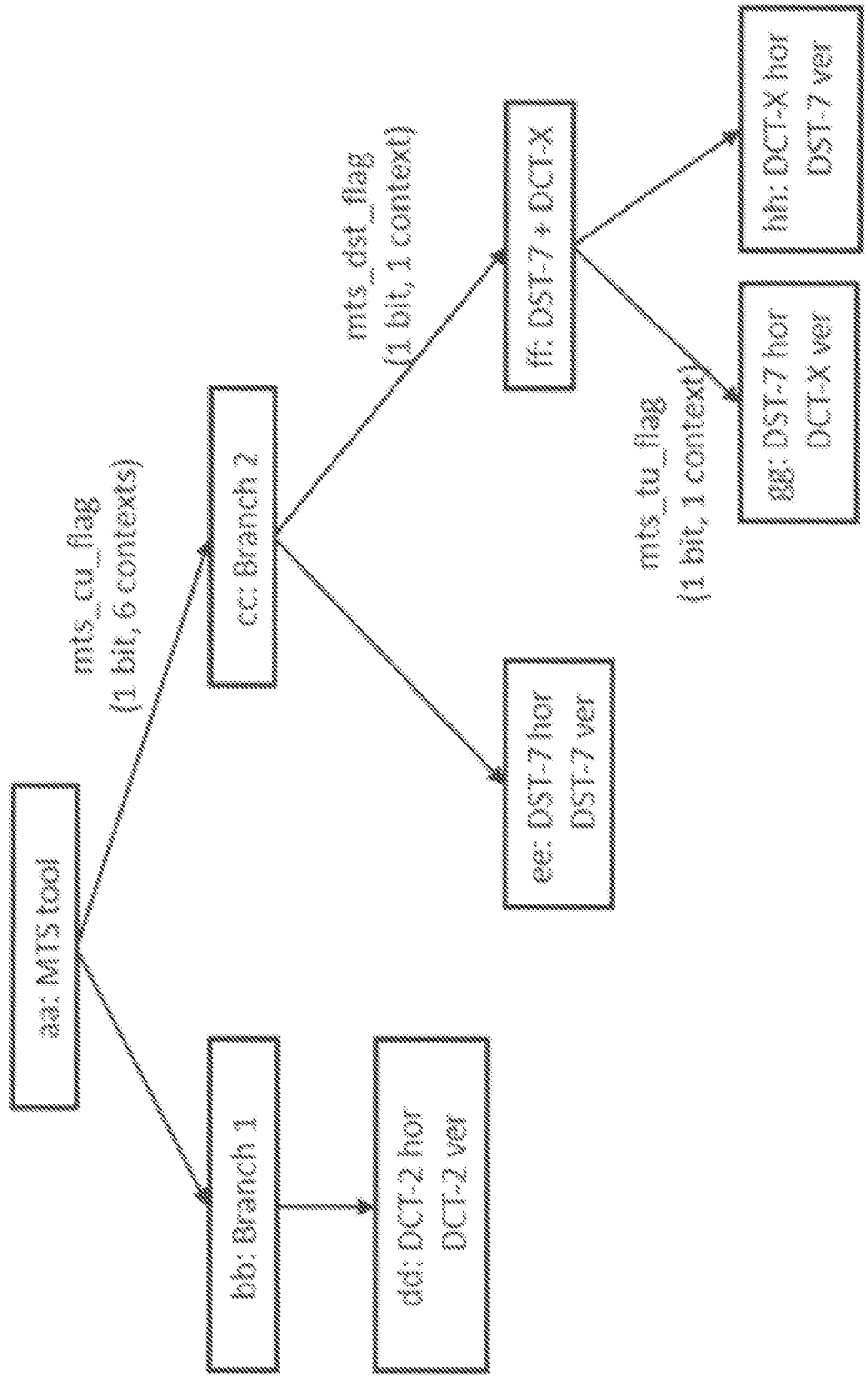
FIG. 5 is a block diagram illustrating components of a MTS tool according to some embodiments.
Figure 6:
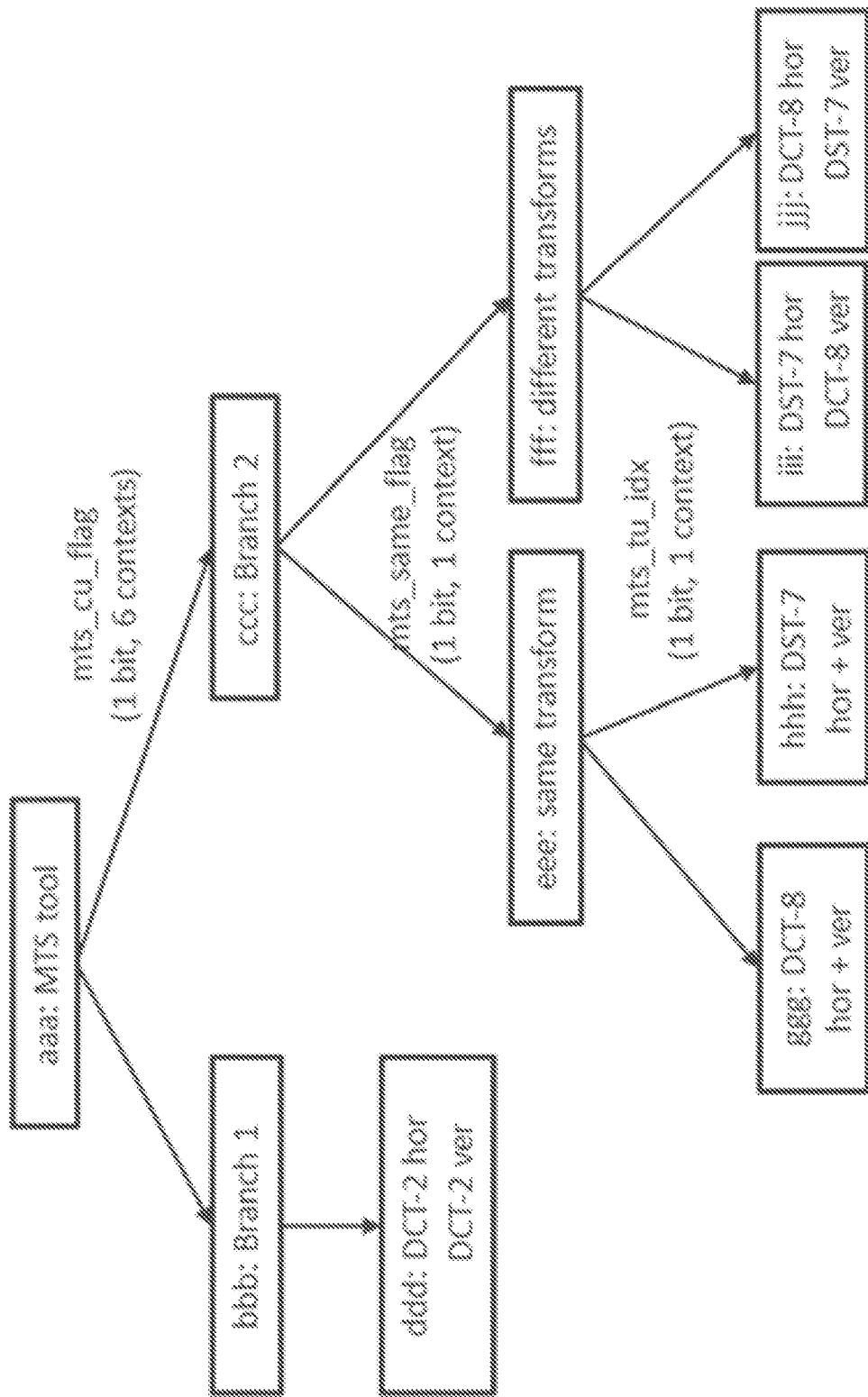
FIG. 6 is a block diagram illustrating components of a MTS tool according to some embodiments.

FIG. 4 illustrates an embodiment of how a MTS tool is presently implemented. FIG. 5 illustrates how the MTS of FIG. 4 is changed in one embodiment. In FIG. 4, each node is marked with a letter followed by a colon sign (i.e., "a:" to "j:"). In FIG. 5, each node is marked with two letters followed by a colon sign (i.e., "aa:" to "hh:"). In FIG. 6, each node is marked with three letters followed by a colon sign (i.e., "aaa:" to "jjj:") The inventors realized that several different changes to the MTS tool currently implemented in the draft of the VVC standard may be made to increase computational efficiency of the encoder and decoder. In the following description of the changes, the nodes of FIG. 4-6 will be referred to by the letter or letters in the figures. Based on FIG. 4, the following changes are made:

Change 1: The combination of DCT-8 horizontally and DCT-8 vertically in branch 2 (node g) is no longer allowed. This implies that an encoder does not evaluate this combination, thus reducing the evaluation run time. The decoder can conclude that, if the mts_tu_idx_hor indicates DCT-8 (node e), the mts_tu_idx_ver will, with the change, always indicate DST-7 (node h).

Change 2: For certain block sizes the DCT-8 in branch 2 (nodes e, g and i in FIG. 4, nodes gg and hh in FIG. 5) is replaced by the DCT-2. If a block is of a specific size, the encoder will know that in branch 2 it will evaluate the DCT-2 instead of the DCT-8. This adds on to change 1 as for these blocks the combination of DCT-2 horizontally and DCT-2 vertically in branch 2 should not be evaluated, as this exact case is already covered in branch 1. The decoder acknowledges this change by applying the DCT-2 instead of the DCT-8 in cases where the block is of a specific size and either the mts_tu_idx_hor or mts_tu_idx_ver indicates the use of the DCT-8. Due to this change, the text below refers to the DCT-X, which means DCT-8 for some block sizes and DCT-2 for other block sizes.

Change 3: The combination of DST-7 horizontally and DST-7 vertically (node j), which is the most common combination of transforms, is moved in the coding tree in FIG. 5 to the position currently occupied by the DCT-X horizontally (node ee). Due to change 1, the mts_tu_idx_ver does not need to be encoded if the mts_tu_idx_hor indicates the DCT-X. This change takes advantage of this omission.

Change 4: As the mts_tu_idx_ver flag is only encoded based on the value of the mts_tu_idx_hor flag, both flags are removed and replaced by two new flags. The two new flags (also illustrated in FIG. 5) are mts_dst_flag and mts_tu_flag.
 a) The mts_dst_flag indicates whether to use DST-7 in both directions.
 b) The mts_tu_flag indicates in which direction DCT-X and DST-7 are to be used.

Change 5: The mts_tu_flag signals whether to use a more preferred combination or a less preferred combination. The determination which of the available combinations is more preferred is made based on the direction of the intra prediction. If a block is using inter prediction, the flag also signals whether to use a more preferred combination, but the determination of which combination is more preferred is based on different information, for instance the block size or block shape.

Change 6: Previously, the context selection of the mts_cu_flag was made based on the split depth. In these changes, the correct context is determined based on the larger dimension (width or height) of the block as well as the direction of the intra prediction. If a block uses inter prediction, the context is selected based on different information, for example, the block size or block shape.

Change 7 (see FIG. 6): The mts_tu_idx_hor flag is replaced by a flag (e.g., mst_same_flag) indicating whether both transforms are identical. If the flag is set, the same transform will be used in both directions. An additional bit will be encoded to indicate which transform to use. If the flag is not set, two different transforms will be used in the two directions, with an additional bit being encoded to indicate which transform to use in which direction.

Change 1 to change 6 are reflected in FIG. 5 and change 7 is reflected in FIG. 6. In the description that follows, various embodiments shall be described indicating which changes are made for specific block sizes and for specific types of blocks (i.e., inter coded blocks or intra coded blocks).

Figure 7:
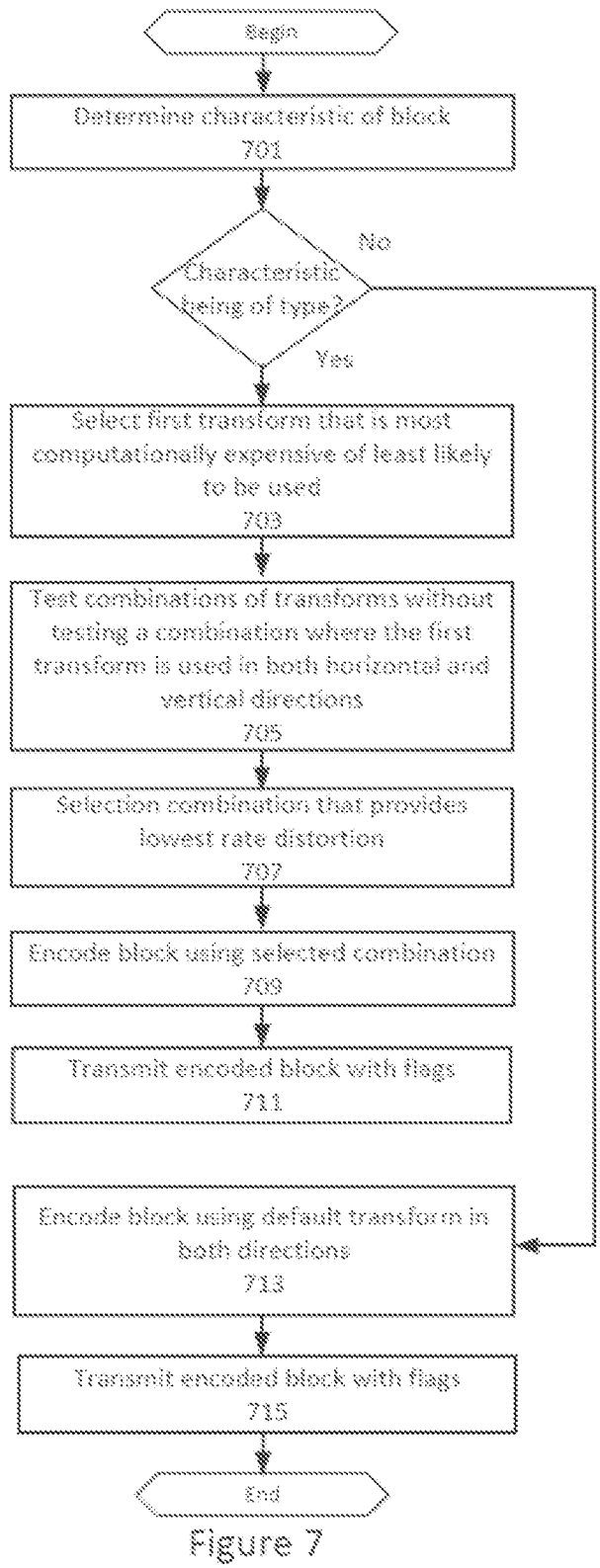
FIGS. 7-11 are flow charts illustrating operations of an encoder and/or decoder in accordance with some embodiments of inventive concepts.

Prior to describing various embodiments based on the above changes, an overview of how the encoder 100 and decoder 108 operate with the changes implemented shall be described. Turning now to FIG. 7, the encoder 100 in operation 701 determines a characteristic of the video block to be encoded. The characteristic may be block size, block type (inter/intra), channel type, prediction mode, dimension (width or height) of the block as well as the direction of the intra prediction, etc.

Responsive to the characteristic being of a type that indicates a multiple transform selection component is used, the encoder 100 in operation 703 selects a first transform from a plurality of transforms used by the multiple selection transform component (MST) and that is either the most computationally expensive or least likely to be used in encoding the video block. For example, when the transforms used by the MST are DCT-2, DST-7, and DCT-8, the DCT-8 often is the most computationally expensive to use. In such scenarios, the DCT-8 transform may be selected and designated as the first transform.

In operation 705, the encoder 100 tests combinations of transforms without testing a combination where the first transform is used both in the horizontal direction and in the vertical direction. For example, the DCT-8 transform in the scenario described in operation 703 would not be tested in both the horizontal direction and the vertical direction.

In operation 707, a combination is selected that provides the lowest rate distortion in comparison to other test combinations. Other decision factors may also be used in selecting the combination to use. For example, of one of the transforms is preferred over another transform and both transforms have comparable rate distortions, the preferred transform may be used.

In operation 709, the video block is encoded using the combination selected to generate an encoded block. In operation 711, the encoded block is transmitted to a decoder, such as decoder 108, with flags that are used by the decoder to determine which combination was used in encoding and is to be used in decoding the encoded block.

Responsive to the characteristic not being of the type, the video block is encoded using a default transformation is both horizontal and vertical directions. In one embodiment, the DCT-2 transform may be used as the default transform. In operation 715, the encoded block is transmitted to the decoder, such as decoder 108, with flags that are used by the decoder to determine which combination was used in encoding and is to be used in decoding the encoded block.

Figure 8:
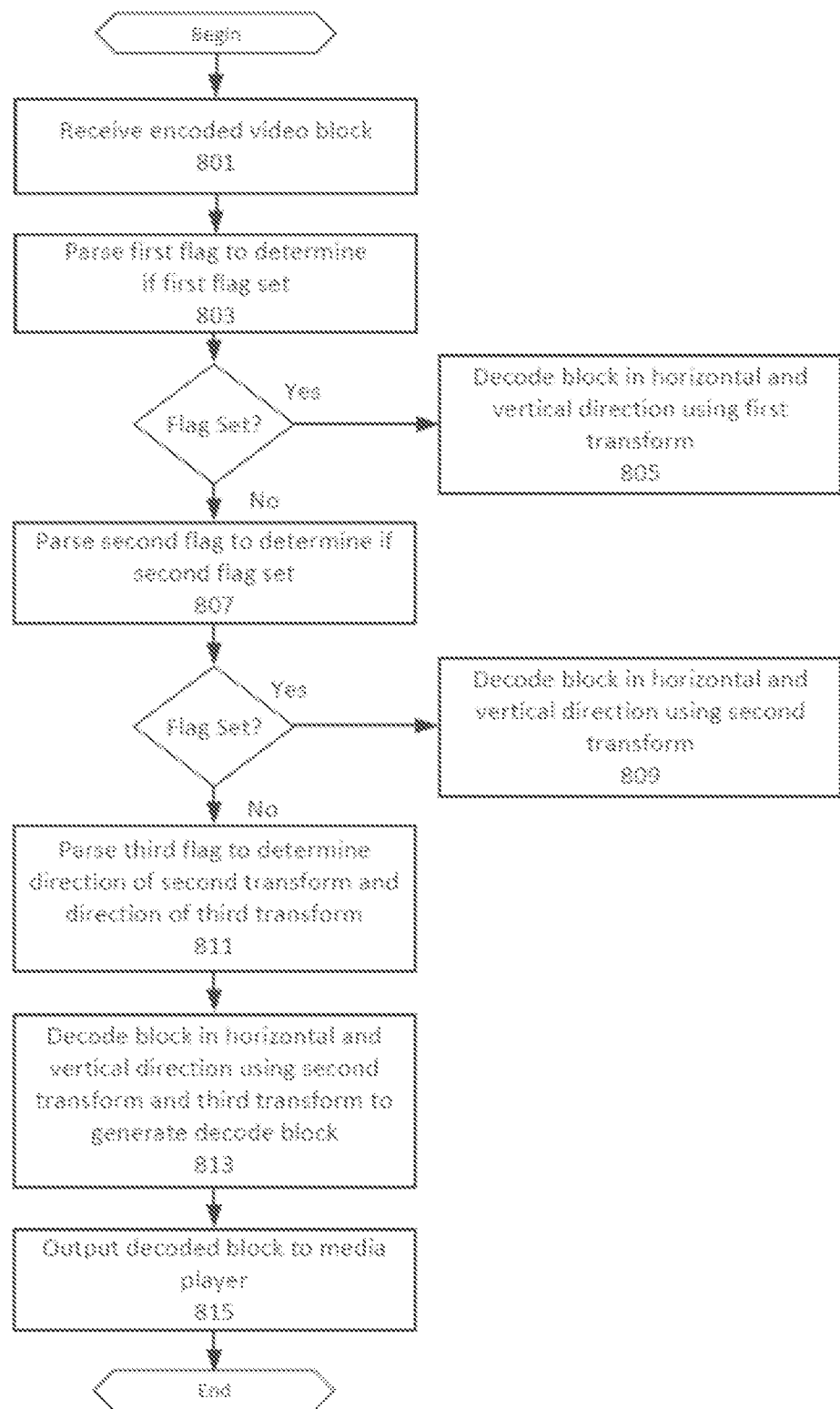

Turning now to FIG. 8, operations that the decoder 108 may perform are illustrated. In operation 801, the decoder receives an encoded video block that has flags. In operation 803, a first flag is parsed to determine if the flag is set. The first flag may be the mts_cu_flag. The flag setting may indicate whether a first transform is to be used to decode the encoded video block in both the horizontal direction and the vertical direction. For example, in one embodiment, the setting may be a binary setting of a 1 or a 0. In other words, the first flag is equal to a first value or a second value A setting of 1 may indicate the first transform is to be used in both directions. In other embodiments, a setting of 0 may be used to indicate the first transform is to be used in both directions.

In operation 805, the video block is decoded using the first transform in both the horizontal direction and the vertical direction responsive to the first flag have a value associated with the first transform being used in both directions (e.g., the first flag is equal to a first value). For example, the DCT-2 transform may be used in both the horizontal direction and the vertical direction to decode the video block.

In operation 807, a second flag is parsed responsive to the first flag setting having a value associated with the first transform not being used in both directions. The second flag is parsed to determine the second flag setting. The flag setting may indicate whether a second transform is to be used to decode the encoded video block in both the horizontal direction and the vertical direction. For example, in one embodiment, the setting may be a binary setting of a 1 or a 0. In other words, the second flag is equal to a first value or a second value. A setting of 1 may indicate the second transform is to be used in both directions. In other embodiments, a setting of 0 may be used to indicate the second transform is to be used in both directions.

The second transform may be one of two transforms. The second flag may be parsed to determine which of the two transforms to be sued to decode the video block. For example, the two transforms in one embodiment may be the DST-7 transform and the DCT-8 transform In operation 809, the video block is decoded using the second transform in both the horizontal direction and the vertical direction responsive to the second flag have a value associated with the second transform being used in both directions (e.g., the second flag is equal to a first value). For example, the DST-7 transform may be used in both the horizontal direction and the vertical direction to decode the video block in operation 809.

In operation 811, a third flag is parsed responsive to the second flag setting having a value associated with the second transform not being used in both directions. The third flag is parsed to determine the third flag setting. The third flag setting may indicate whether a second transform is to be used to decode the encoded video block in the horizontal direction or the vertical direction and a third transform to be used to decode in the other of the horizontal direction and vertical direction. This may be a first preferred transform combination. For example, in one embodiment, the setting may be a binary setting of a 1 or a 0. A setting of 1 may indicate the second transform is to be used in the horizontal direction and the third transform is to be used in the vertical direction. In other embodiments, a setting of 0 may be used to indicate the second transform is to be used in the horizontal direction and the third transform to be used in the vertical direction. This may be a second preferred transform combination. The third transform in an embodiment may be the first transform.

In operation 813, the video block is decoded using the second transform in either the horizontal direction or the vertical direction based on the setting of the third flag. For example, the DST-7 transform may be used in the horizontal direction and either the DCT-2 or DCT-8 transform used in the vertical direction to decode the video block in operation 813. Alternatively, the DST-7 transform may be used in the vertical direction and either the DCT-2 or DCT-8 transform used in the horizontal direction to decode the video block in operation 813.

In operation 815, the decoder may output the decoded video block to a media player for playback of the decoded video block.

Figure 9:
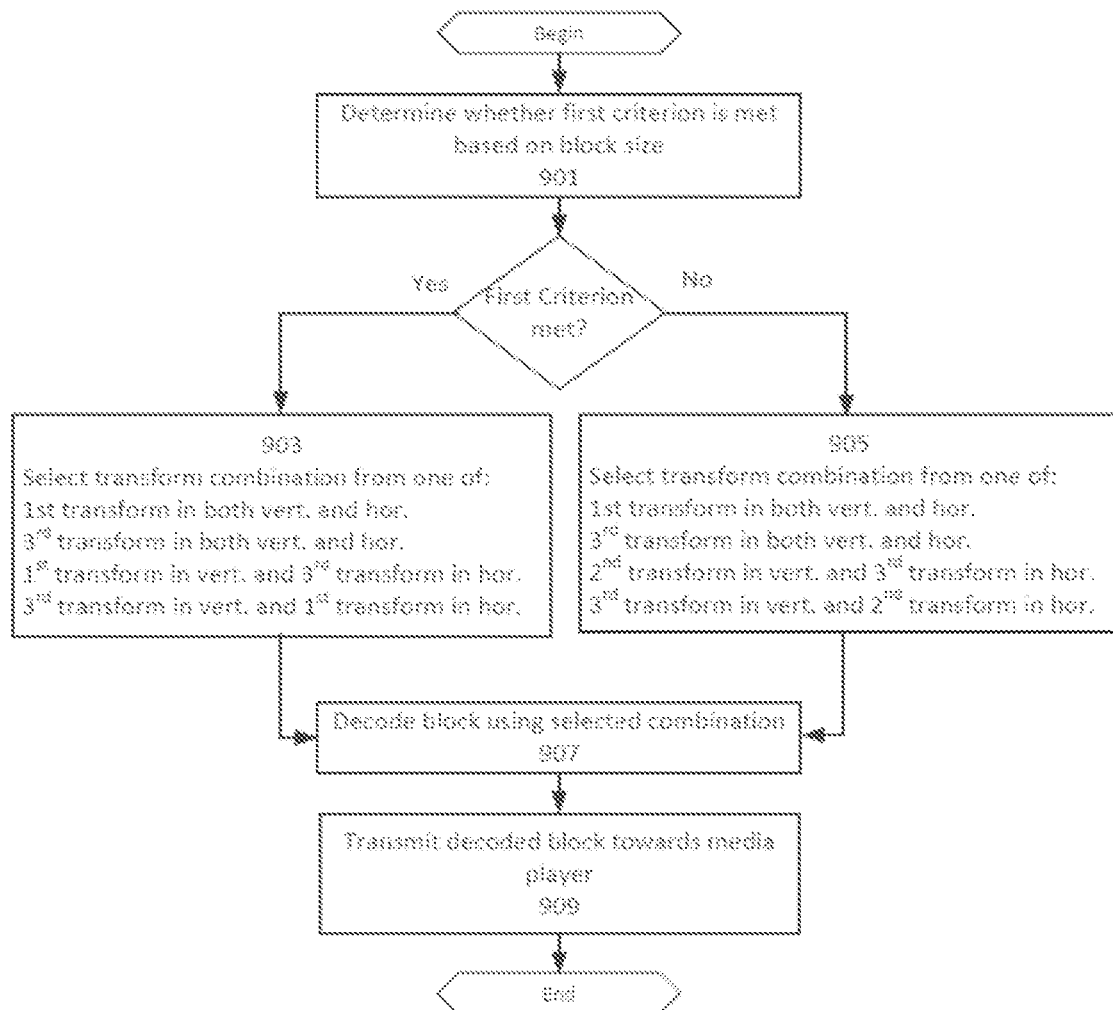

Turning now to FIG. 9, in an alternate embodiment, the decoder 108 in operation 901 determines whether a first criterion is met based on the block size of the encoded video block. The criterion may be block size, block type (inter/intra), channel type, prediction mode, dimension (width or height) of the block, etc.

In operation 903, responsive to the first criterion met, the decoder selects the transform combination from one: of the first transform in both the vertical direction and the horizontal direction; the third transform in both the vertical direction and the horizontal direction; the first transform in the vertical direction and the third transform in the horizontal direction; and the third transform in the vertical direction and the first transform in the horizontal direction.

In operation 905, responsive to the first criterion met, the decoder selects the transform combination from one of: the first transform in both the vertical direction and the horizontal direction; the third transform in both the vertical direction and the horizontal direction; the second transform in the vertical direction and the third transform in the horizontal direction; and the third transform in the vertical direction and the second transform in the horizontal direction.

Inn operation 907, the decoder decodes the block using the selected combination. In operation 909, the decoder may transmit the encoded block towards a media player.

The first transform in the embodiments described below is the DCT-2 transform, the second transform is the DCT-8 transform, and the third transform is the DST-7 transform. In the description of the embodiments that follows, the first criterion is block size.

In a first embodiment, change 1 is done for all block sizes where the MTS tool is allowed, and change 2 is done for all blocks where at least one dimension has a length of 32 samples. In this first embodiment all blocks of size 16×16 or smaller evaluate the following combinations:
  DCT-2 horizontally and DCT-2 vertically
  DST-7 horizontally and DST-7 vertically
  DST-7 horizontally and DCT-8 vertically
  DCT-8 horizontally and DST-7 vertically For blocks of size 32×N or N×32 in the first embodiment, where N can be 4, 8, 16 or 32, the following combinations are evaluated:
  DCT-2 horizontally and DCT-2 vertically
  DST-7 horizontally and DST-7 vertically
  DST-7 horizontally and DCT-2 vertically
  DCT-2 horizontally and DST-7 vertically The decoder can determine the correct combination of transforms based on the parsed flags and the block size. If the block is of size 16×16 or smaller, the decoded bins can indicate the following combinations:
  DCT-2 horizontally and DCT-2 vertically
  DST-7 horizontally and DST-7 vertically
  DST-7 horizontally and DCT-8 vertically
  DCT-8 horizontally and DST-7 vertically If the block is of size 32×N or N×32 in the first embodiment, where N can be 4, 8, 16 or 32 (i.e., the first criterion of FIG. 9 is met when the encoded block has a size of form 32×N or N×32 where N can assume the values 4, 8, 16, or 32), the following combinations can be indicated:
  DCT-2 horizontally and DCT-2 vertically
  DST-7 horizontally and DST-7 vertically
  DST-7 horizontally and DCT-2 vertically
  DCT-2 horizontally and DST-7 vertically Table 1 shows where DCT-2 and DCT-8 are used in the first embodiment:

TABLE 1

|  |  | Block width | | | |
| --- | --- | --- | --- | --- | --- |
|  |  | 4 | 8 | 16 | 32 |
| Block | 4 | DCT-8 | DCT-8 | DCT-8 | DCT-2 |
| height | 8 | DCT-8 | DCT-8 | DCT-8 | DCT-2 |
|  | 16 | DCT-8 | DCT-8 | DCT-8 | DCT-2 |
|  | 32 | DCT-2 | DCT-2 | DCT-2 | DCT-2 |

In a second embodiment, change 1 is done for all block sizes where the MTS tool is allowed, and change 2 is done for all blocks of size 16×32, 32×16 or 32×32. In this embodiment all blocks of size 16×16 or smaller, 4×32, 8×32, 32×4 and 32×8 evaluate the following combinations:
  DCT-2 horizontally and DCT-2 vertically
  DST-7 horizontally and DST-7 vertically
  DST-7 horizontally and DCT-8 vertically
  DCT-8 horizontally and DST-7 vertically For blocks of size 32×16, 16×32 or 32×32 in the second embodiment, the following combinations are evaluated:
  DCT-2 horizontally and DCT-2 vertically
  DST-7 horizontally and DST-7 vertically DST-7 horizontally and DCT-2 vertically
DCT-2 horizontally and DST-7 vertically The decoder is able to determine the correct combination of transforms based on the parsed flags and the block size. If the block is of size 16×16 or smaller, 4×32, 8×32, 32×4 or 32×8 the decoded bins can indicate the following combinations:

DCT-2 horizontally and DCT-2 vertically
DST-7 horizontally and DST-7 vertically
DST-7 horizontally and DCT-8 vertically
DCT-8 horizontally and DST-7 vertically If the block is of size 32×16, 16×32 or 32×32 in the second embodiment (i.e., the first criterion of FIG. 9 is met when the encoded block has a size of form 32×32 or 32×16 or 16×32), the following combinations can be indicated:

DCT-2 horizontally and DCT-2 vertically
DST-7 horizontally and DST-7 vertically
DST-7 horizontally and DCT-2 vertically
DCT-2 horizontally and DST-7 vertically Table 2 shows where DCT-2 and DCT-8 are used in the second embodiment:

TABLE 2

|  |  | Block width | | | |
|---|---|---|---|---|---|
|  |  | 4 | 8 | 16 | 32 |
| Block height | 4 | DCT-8 | DCT-8 | DCT-8 | DCT-8 |
|  | 8 | DCT-8 | DCT-8 | DCT-8 | DCT-8 |
|  | 16 | DCT-8 | DCT-8 | DCT-8 | DCT-2 |
|  | 32 | DCT-8 | DCT-8 | DCT-2 | DCT-2 |

In a third embodiment, changes 1, 3 and 4 are done for all block sizes. If a step to the right in FIG. 5 is encoded as a '1', and a step to the left is encoded as a '0', the combinations would be encoded as follows:

TABLE 3

| Horizontal transform | Vertical transform | mts_cu_flag | mts_dst_flag | mts_tu_flag |
|---|---|---|---|---|
| DCT-2 | DCT-2 | 0 | | |
| DST-7 | DST-7 | 1 | 0 | |
| DST-7 | DCT-X | 1 | 1 | 0 |
| DCT-X | DST-7 | 1 | 1 | 1 |

The decoder will parse the flags and determine the combination of transforms based on the decoded bins. With respect to FIG. 8, the mts_cu_flag may be the first flag, the mts_dst_flag may be the second flag, and the mts_tu_flag may be the third flag.

TABLE 4

| mts_cu_flag | mts_dst_flag | mts_tu_flag | Horizontal transform | Vertical transform |
|---|---|---|---|---|
| 0 | | | DCT-2 | DCT-2 |
| 1 | 0 | | DST-7 | DST-7 |
| 1 | 1 | 0 | DST-7 | DCT-X |
| 1 | 1 | 1 | DCT-X | DST-7 |

Figure 10:
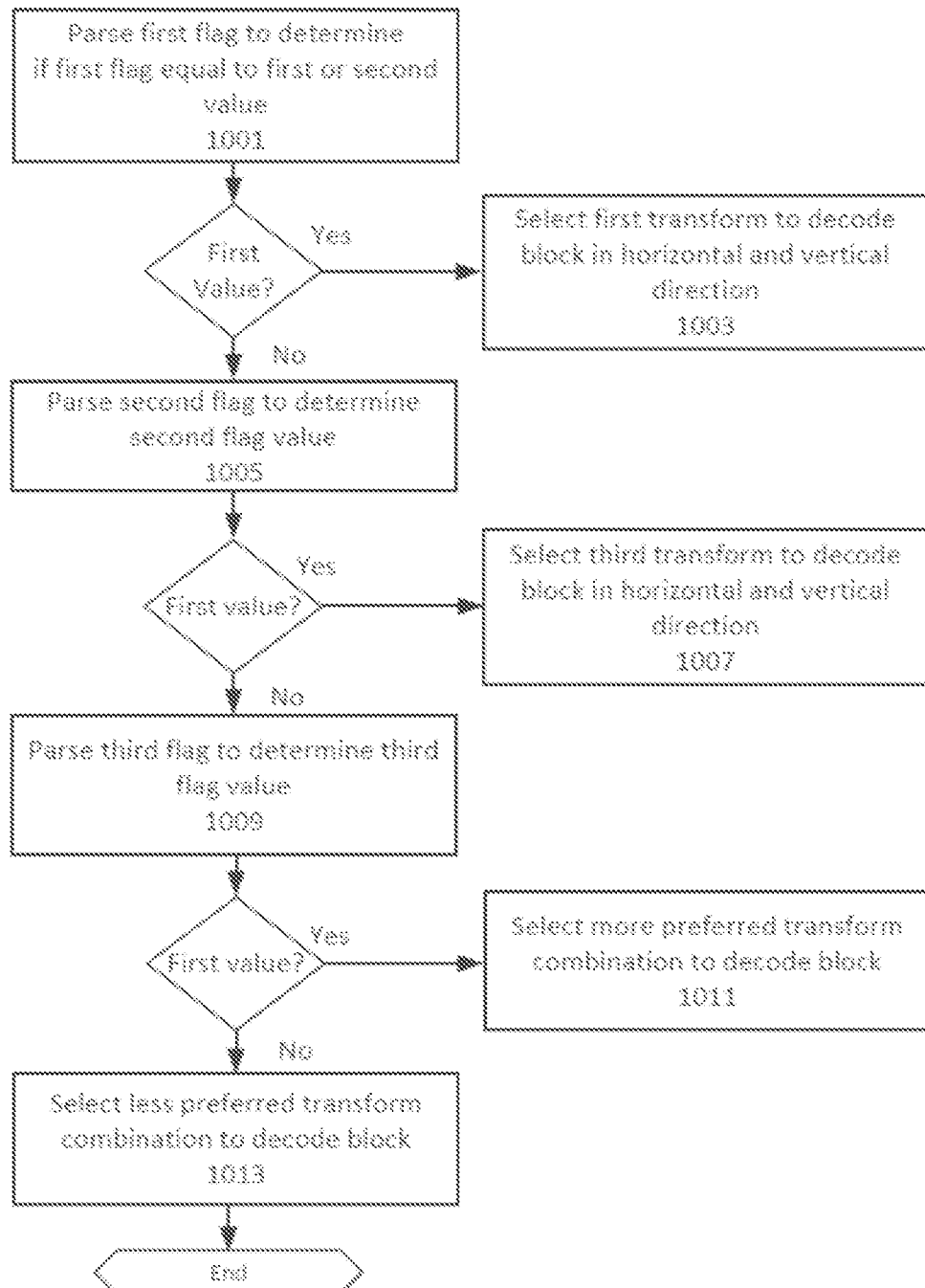

In a set of embodiments, changes 1, 3, 4 and 5 are done for all block sizes. As an example, the more preferred combination as described in change 5 can be marked by setting the mts_tu_flag to '1' and the less preferred combination as described in change 5 can be marked by setting the mts_tu_flag to '0'. FIG. 10 illustrates this embodiment.

Turning to FIG. 10, table 4 may be used by the decoder to determine the transform combination to use. In operation 1001, the decoder parses the first flag to determine if the first flag is equal to a first value or a second value. In operation 1003, responsive to the first flag being equal to the first value, the first transform is selected to decode the encoded block in both the vertical direction and the horizontal direction. In operation 1005, responsive to the first flag being equal to the second value, a second flag is parsed to determine whether the second flag is equal to the first value or the second value. In operation 1007, responsive to the second flag being equal to the first value, the third transform is selected to decode the encoded block in both the vertical direction and the horizontal direction. In operation 1009, responsive to the second flag being equal to the second value, a third flag is parsed to determine whether the third flag is equal to the first value or the second value. In operation 1011, responsive to the third flag being equal to the first value, a more preferred transform combination is selected to decode the encoded block. In operation 1013, responsive to the third flag being equal to the second value, a less preferred transform combination is selected to decode the encoded block.

In a fifth embodiment that is one of the set of embodiments, if the block is using intra prediction, the combination of using DST-7 horizontally and DCT-X vertically is regarded more preferred if the intra direction is closer to horizontal than to vertical. At the same time, if the intra direction is closer to vertical than to horizontal, the combination of using DCT-X horizontally and DST-7 vertically is regarded as more preferred. Thus, the decoder will determine the combination based on the intra direction of the block.

If the intra direction is, for example, purely horizontal, and the decoder reads the mts_tu_flag as '1', it will use a transform combination of DST-7 horizontally and DCT-X vertically. If the flag is read as '0', the decoder will use a transform combination of DCT-X horizontally and the DST-7 vertically.

If the intra direction is, for example, purely vertical, and the decoder reads the mts_tu_flag as '1', it will use a transform combination of DCT-X horizontally and the DST-7 vertically. If the flag is read as '0', the decoder will use a transform combination of DST-7 horizontally and DCT-X vertically.

In a sixth embodiment that is one of the set of embodiments, if the block is using inter prediction, the combination of using DST-7 horizontally and DCT-X vertically is regarded as more probable if the block has a larger width than height. If the block has a larger height than width the combination of using DCT-X horizontally and DST-7 vertically is regarded as more probable.

If the block has, for example, a size of 16×4 samples, and the decoder reads the mts_tu_flag as '1', it will use a transform combination of DST-7 horizontally and DCT-X vertically. If the flag is read as '0', the decoder will use a transform combination of DCT-X horizontally and the DST-7 vertically.

If the block has, for example, a size of 4×16 samples, and the decoder reads the mts_tu_flag as '1', it will use a transform combination of DCT-X horizontally and DST-7 vertically. If the flag is read as '0', the decoder will use a transform combination of DST-7 horizontally and the DCT-X vertically.

In the embodiments above, a 45-degree prediction direction is equally close to vertical as to horizontal. Therefore, the decoder and encoder have to agree on a tie-breaking rule to treat 45-degree directions in the same manner. In the set of embodiments above, this is handled by treating 45-degree directions as more vertical than horizontal. In a different embodiment, it may be advantageous to use a different tie-breaking rule, such as treating 45-degree directions as horizontal. Another possibility is to change at another degree than 45-degree directions. As an example, it may be advantageous to treat not only 45-degree directions as vertical, but also treat, for example, 43-degree directions as vertical, although mathematically they are closer to a horizontal direction. In general, it is therefore possible to use any angle in the tie-break rule, not just diagonal directions.

Another case where a tie-breaking rule should be defined are non-directional intra prediction modes (planar or DC). In the set of embodiments above, these predictions are treated as more horizontal than vertical. In a slightly different embodiment, it might be advantageous to treat these as more vertical than horizontal. For example, in an implementation, the intra modes 0-34 are treated as being closer to horizontal and the intra modes 35-66 are treated as being closer to vertical.

In a seventh embodiment, change 6 is used for intra coded blocks. The selection of which context to use for encoding and decoding the mts_cu_flag is made based on the longer side of the block and the intra direction. The intra directions are divided into two groups, one where using the DCT-2 horizontally and vertically is more preferred and one where using the DCT-2 horizontally and vertically is less preferred. These groups can be identical for different block sizes. Using the DCT-2 both horizontally and vertically can for example be more preferred if the intra mode is close to horizontal or vertical. In the same example, the combination would be less preferred if the intra direction is close to diagonal.

Figure 11:
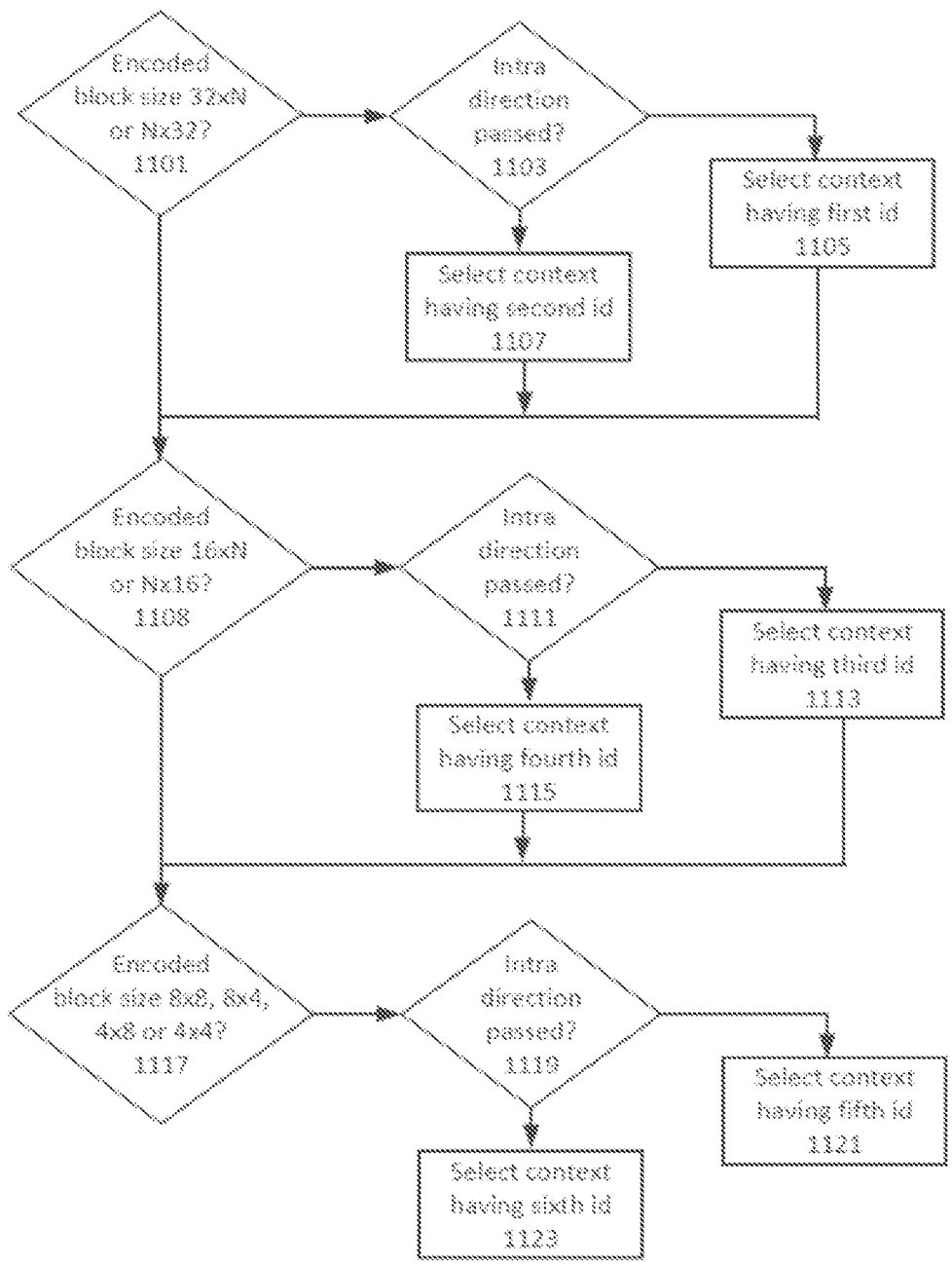

Turning to FIG. 11, in operation 1101, the decoder determines if the block is of size 32×N or N×32 where N can be 4, 8, 16 or 32. In operation 1103, responsive to the block being one of size 32×N or N×32 and the intra direction is close to horizontal or close to vertical (i.e., it passes one of a horizontal closeness test or a vertical closeness test as determined in operation 1103), for instance if it is purely horizontal, one context will be chosen, for example with a first identifier (id) 0 in operation 1105.

Responsive to the block being of size 32×N or N×32 where N can be 4, 8, 16 or 32 and the intra direction is close to diagonal (i.e., it does not pass one of a horizontal closeness test or a vertical closeness test as determined in operation 1103), for instance if it is purely diagonal, a different context will be chosen, for example with a second id 1 in operation 1107.

In operation 1108, the decoder determines if the block is of size 16×N or N×16 where N can be 4, 8 or 16. In operation 1111, responsive to the block being one of size 16×N or N×16 and the intra direction is close to horizontal or close to vertical (i.e., it passes one of a horizontal closeness test or a vertical closeness test as determined in operation 1111), for instance if it is purely vertical, a different context will be chosen, for example with a third id 2 in operation 1113.

Responsive to the block being is of size 16×N or N×16 where N can be 4, 8 or 16 and the intra direction is close to diagonal (i.e., it does not pass one of a horizontal closeness test or a vertical closeness test as determined in operation 1111), for instance if it is purely diagonal, a different context will be chosen, for example with a fourth id 3 in operation 1115.

In operation 1117, the decoder determines, if the block is of size 8×8, 8×4, 4×8 or a 4×4. In operation 1119, responsive to the block being one of size 8×8, 8×4, 4×8, or 4×4 and the intra direction is close to horizontal or close to vertical (i.e., it passes one of a horizontal closeness test or a vertical closeness test as determined in operation 1119), for instance if it is purely horizontal, a different context will be chosen, for example with a fifth id 4 in operation 1121.

Responsive to the block being of size 8×8, 8×4, 4×8 or 4×4 and the intra direction is close to diagonal (i.e., it does not pass one of a horizontal closeness test or a vertical closeness test as determined in operation 1119), for instance if it is purely diagonal, a different context will be chosen, for example with a sixth id 5 in operation 1123.

This can be summarized in the following table:

TABLE 5

| | | Type of intra direction | |
|---|---|---|---|
| | | Closer to horizontal or vertical | Closer to diagonal |
| Block sizes | 32 × N or N × 32 | id 0 | id 1 |
| | 16 × N or N × 16 | id 2 | id 3 |
| | 4 × N, 8 × N, N × 4 or N × 8 | id 4 | Id 5 |

As described in the previous embodiment, a set of tie-breaking rules should be defined for the encoder and decoder for the cases where a prediction direction is equally close to horizontal and vertical. Tie-breaking rules should also be defined for the non-directional intra prediction modes Planar or DC. For example, in one implementation, the intra modes 10-22 may be seen as close to horizontal and may be treated as being horizontal, the intra modes 46-57 may be seen as close to vertical and may be treated as being vertical, and the remaining intra modes 0-9, 23-45 and 58-66 may be seen as close to diagonal and be treated as being diagonal.

In an eighth embodiment, change 6 is used for inter coded blocks. The selection of which context to use for encoding and decoding the mts_cu_flag is made based on the block size and shape. For example, the six contexts can be selected as follows:

a) If the block is of size 4×32 or 32×4 in the eighth embodiment, one context is used, for example with identifier (id) 0.

b) If the block is of size 4×16, 8×32, 32×8 or 16×4 in the eighth embodiment, a different context is used, for example with id 1.

c) If the block is of size 4×8 or 8×4 in the eighth embodiment, a different context is used, for example with id 2.

d) If the block is of size 8×16, 16×32, 32×16 or 16×8 in the eighth embodiment, a different context is used, for example with id 3.

e) If the block is of size 16×16 or 32×32 in the eighth embodiment, a different context is used, for example with id 4.

f) If the block is of size 8×8 or 4×4 in the eighth embodiment, a different context is used, for example with id 5.

The eighth embodiment can be summarized in Table 6:

TABLE 6

|  |  | Block width | | | |
|---|---|---|---|---|---|
|  |  | 4 | 8 | 16 | 32 |
| Block height | 4 | id 5 | id 2 | id 1 | id 0 |
|  | 8 | id 2 | id 5 | id 3 | id 1 |
|  | 16 | id 1 | id 3 | id 4 | id 3 |
|  | 32 | id 0 | id 1 | id 3 | id 4 |

In a ninth embodiment, change 1 is done for all block sizes where the MTS tool is allowed, and change 2 is done for all blocks where at least one dimension has a length of 16 or 32 samples. In this embodiment all blocks of size 8×8 or smaller evaluate the following combinations:
  DCT-2 horizontally and DCT-2 vertically
  DST-7 horizontally and DST-7 vertically
  DST-7 horizontally and DCT-8 vertically
  DCT-8 horizontally and DST-7 vertically
For blocks of size 16×N, N×16, 32×N or N×32 in the ninth embodiment, where N can be 4, 8, 16 or 32, the following combinations are evaluated:
  DCT-2 horizontally and DCT-2 vertically
  DST-7 horizontally and DST-7 vertically
  DST-7 horizontally and DCT-2 vertically
  DCT-2 horizontally and DST-7 vertically
The decoder can determine the correct combination of transforms based on the parsed flags and the block size. If the block is of size 8×8 or smaller, the decoded bins can indicate the following combinations:
  DCT-2 horizontally and DCT-2 vertically
  DST-7 horizontally and DST-7 vertically
  DST-7 horizontally and DCT-8 vertically
  DCT-8 horizontally and DST-7 vertically
If the block is of size 16×N, N×16, 32×N or N×32 in the ninth embodiment, where N can be 4, 8, 16 or 32 (i.e., the first criterion of FIG. 9 is met when the encoded block has a size of form 16×N, N×16, 32×N or N×32 where N can assume the values 4, 8, 16, or 32), the following combinations can be indicated:
  DCT-2 horizontally and DCT-2 vertically
  DST-7 horizontally and DST-7 vertically
  DST-7 horizontally and DCT-2 vertically
  DCT-2 horizontally and DST-7 vertically
Table 7 shows where DCT-2 and DCT-8 are used in the ninth embodiment:

TABLE 7

|  |  | Block width | | | |
|---|---|---|---|---|---|
|  |  | 4 | 8 | 16 | 32 |
| Block height | 4 | DCT-8 | DCT-8 | DCT-2 | DCT-2 |
|  | 8 | DCT-8 | DCT-8 | DCT-2 | DCT-2 |
|  | 16 | DCT-2 | DCT-2 | DCT-2 | DCT-2 |
|  | 32 | DCT-2 | DCT-2 | DCT-2 | DCT-2 |

In a tenth embodiment, change 1 is done for all block sizes where the MTS tool is allowed, and change 2 is done for all blocks where at least one dimension has a length of 32 samples or 4 samples. In this embodiment all blocks of size 8×8, 8×16, 16×8 or 16×16 evaluate the following combinations:
  DCT-2 horizontally and DCT-2 vertically
  DST-7 horizontally and DST-7 vertically
  DST-7 horizontally and DCT-8 vertically
  DCT-8 horizontally and DST-7 vertically
For blocks of size 4×N, N×4, 32×N or N×32 in the tenth embodiment, where N can be 4, 8, 16 or 32, the following combinations are evaluated:
  DCT-2 horizontally and DCT-2 vertically
  DST-7 horizontally and DST-7 vertically
  DST-7 horizontally and DCT-2 vertically
  DCT-2 horizontally and DST-7 vertically
The decoder can determine the correct combination of transforms based on the parsed flags and the block size. If the block is of size 8×8, 8×16, 16×8 or 16×16, the decoded bins can indicate the following combinations:
  DCT-2 horizontally and DCT-2 vertically
  DST-7 horizontally and DST-7 vertically
  DST-7 horizontally and DCT-8 vertically
  DCT-8 horizontally and DST-7 vertically
If the block is of size 4×N, N×4, 32×N or N×32 in the tenth embodiment, where N can be 4, 8, 16 or 32 (i.e., the first criterion of FIG. 9 is met when the encoded block has a size of form 4×N, N×4, 32×N or N×32 where N can assume the values 4, 8, 16, or 32), the following combinations can be indicated:
  DCT-2 horizontally and DCT-2 vertically
  DST-7 horizontally and DST-7 vertically
  DST-7 horizontally and DCT-2 vertically
  DCT-2 horizontally and DST-7 vertically
Table 8 shows where DCT-2 and DCT-8 are used in the tenth embodiment:

TABLE 8

|  |  | Block width | | | |
|---|---|---|---|---|---|
|  |  | 4 | 8 | 16 | 32 |
| Block height | 4 | DCT-2 | DCT-2 | DCT-2 | DCT-2 |
|  | 8 | DCT-2 | DCT-8 | DCT-8 | DCT-2 |
|  | 16 | DCT-2 | DCT-8 | DCT-8 | DCT-2 |
|  | 32 | DCT-2 | DCT-2 | DCT-2 | DCT-2 |

In an eleventh embodiment, change 1 is done for all block sizes where the MTS tool is allowed, and change 2 is done for all blocks where at least one dimension has a length of 32 samples or the block has a size of 4×4 samples. In this embodiment all blocks of size 16×16 or smaller but larger than 4×4 evaluate the following combinations:
  DCT-2 horizontally and DCT-2 vertically
  DST-7 horizontally and DST-7 vertically
  DST-7 horizontally and DCT-8 vertically
  DCT-8 horizontally and DST-7 vertically
For blocks of size 4×4, 32×N or N×32 in the eleventh embodiment, where N can be 4, 8, 16 or 32, the following combinations are evaluated:
  DCT-2 horizontally and DCT-2 vertically
  DST-7 horizontally and DST-7 vertically
  DST-7 horizontally and DCT-2 vertically
  DCT-2 horizontally and DST-7 vertically
The decoder can determine the correct combination of transforms based on the parsed flags and the block size. If the block is of size 16×16 or smaller but larger than 4×4, the decoded bins can indicate the following combinations:
  DCT-2 horizontally and DCT-2 vertically
  DST-7 horizontally and DST-7 vertically
  DST-7 horizontally and DCT-8 vertically
  DCT-8 horizontally and DST-7 vertically
If the block is of size 4×4, 32×N or N×32 in the eleventh embodiment, where N can be 4, 8, 16 or 32 (i.e., the first criterion of FIG. 9 is met when the encoded block has a size of form 4×4, 32×N or N×32 where N can assume the values 4, 8, 16, or 32), the following combinations can be indicated:

DCT-2 horizontally and DCT-2 vertically
DST-7 horizontally and DST-7 vertically
DST-7 horizontally and DCT-2 vertically
DCT-2 horizontally and DST-7 vertically Table 9 shows where DCT-2 and DCT-8 are used in the eleventh embodiment:

TABLE 9

|  |  | Block width | | | |
| --- | --- | --- | --- | --- | --- |
|  |  | 4 | 8 | 16 | 32 |
| Block height | 4 | DCT-2 | DCT-8 | DCT-8 | DCT-2 |
|  | 8 | DCT-8 | DCT-8 | DCT-8 | DCT-2 |
|  | 16 | DCT-8 | DCT-8 | DCT-8 | DCT-2 |
|  | 32 | DCT-2 | DCT-2 | DCT-2 | DCT-2 |

In a twelfth embodiment, changes 1 and 2 is done for all block sizes where the MTS tool is allowed. In this embodiment all blocks evaluate the following combinations:

DCT-2 horizontally and DCT-2 vertically
DST-7 horizontally and DST-7 vertically
DST-7 horizontally and DCT-2 vertically
DCT-2 horizontally and DST-7 vertically The decoder can determine the correct combination of transforms based on the parsed flags. The decoded bins can indicate the following combinations:

DCT-2 horizontally and DCT-2 vertically
DST-7 horizontally and DST-7 vertically
DST-7 horizontally and DCT-2 vertically
DCT-2 horizontally and DST-7 vertically In a further set of embodiments, change 7 is incorporated. A new flag, called mts_same_flag, is signaled to indicate whether a block use the same transform in both horizontal and vertical direction. In one embodiment, if the flag has the value '1', the block uses identical transforms in both directions, whereas if the flag has the value '0', two different transformations will be used.

In an embodiment, the mts_same_flag indicates that a block uses the same transform in both horizontal and vertical direction. An additional flag mts_tu_idx is signaled to indicate whether to use DCT-8 or DST-7 in both directions.

In another embodiment, the mts_same_flag indicates that a block uses different transforms in horizontal and vertical direction. An additional flag mts_tu_idx is signaled to indicate whether to use DCT-8 in the horizontal direction and DST-7 in the vertical direction, or DST-7 in the horizontal direction and DCT-8 in the vertical direction.

The processing in the decoder works analogously. First, the mts_same_flag is parsed by the decoder, followed by parsing the mts_tu_idx to determine the correct combination of transforms to use.

In another embodiment, the mts_same_flag is parsed by the decoder, indicating that the same transform should be used in both horizontal and vertical direction. Afterwards, the mts_tu_idx is parsed by the decoder, indicating whether to use DST-7 or DCT-8 in both directions.

In another embodiment, the mts_same_flag is parsed by the decoder, indicating that two different transforms should be used for the current block. The mts_tu_idx is parsed by the decoder to determine whether to use DCT-8 in horizontal and DST-7 in vertical direction, or DST-7 in horizontal and DCT-8 in vertical direction Thus, the disabling of one of the transform combination which enables the change to the CABAC coding by replacing the two existing flags as described herein with two new flags. Another key aspect is to replace one transform in certain cases by a different transform.

REFERENCES

[1] F. Bossen, J. Boyce, X. Li, V. Seregin, K. Suhring (editors): "JVET common test conditions and software reference configurations for SDR video", JVET-L1010, Macau, October 2018
[2] G. J. Sullivan, J.-R. Ohm: "Meeting Report of the 11th JVET Meeting, (Ljubljana, 10-18 Jul. 2018)", section 6.6, JVET-K1000, Ljubljana, July 2018

What is claimed is:

1. A method performed by a decoder, the method comprising:
obtaining an encoded video block having at least one flag;
parsing a flag of the at least one flag to determine if the flag is set to signal that a transform of a plurality of transforms is to be used to decode the encoded video block in both a horizontal direction and a vertical direction to generate a decoded video block; and
responsive to when the flag is determined to be set to signal that the transform is not to be used in both the horizontal direction and in the vertical direction when decoding, parsing another flag of the at least one flag to determine in which one of the horizontal direction or the vertical direction the transform is to be used to decode the encoded video block.

2. The method of claim 1, wherein the transform comprises one of two available alternative transforms, the method further comprising determining which one of the two available alternative transforms is to be used to decode the encoded video block based on parsing the flag.

3. The method of claim 2, wherein one of the two available alternative transforms is a Discrete Sine Transformation, DST-7, and the other of the two available alternative transforms is a Discrete Cosine Transformation, DCT-8.

4. The method of claim 1,
wherein the flag is a second flag, the transform is a second transform, the another flag is a third flag, and the another transform is a third transform, and
before parsing the second flag to determine if the second flag is set to signal that the second transform is to be used to decode the encoded video block in both the horizontal direction and the vertical direction, further comprising:
parsing a first flag of the at least one flag to determine if the first flag is set to signal that a first transform of the plurality of transforms is to be used to decode the encoded video block in the horizontal direction and the vertical direction to generate the decoded video block; and
responsive to when the first flag is determined to be set to signal that the first transform is to be used to decode the encoded video block in both the horizontal direction and in the vertical direction,
decoding the encoded video block in the horizontal direction and the vertical direction using the first transform to generate a decoded video block;
wherein the parsing the second flag is performed responsive to when the first flag is determined to be set to signal that the first transform is not to be used to decode the encoded video block in both the horizontal direction and in the vertical direction.

5. The method of claim 4, wherein the first transform comprises a DCT-2 transform.

6. The method of claim 1, wherein the transform comprises a DST-7 transform.

7. The method of claim 1, wherein the another transform comprises one of a DCT-2 transform or a DCT-8 transform.

8. The method of claim 1, wherein the another flag of the at least one flag is parsed both to determine in which one of the horizontal direction or the vertical direction the transform is to be used to decode the encoded video block and to determine in which other one of the horizontal direction or the vertical direction another transform is to be used to decode the encoded video block.

9. The method of claim 8, the method further comprising:
decoding the encoded video block using the transform in the one of the horizontal direction or the vertical direction and using the another transform in the other one of the horizontal direction or the vertical direction to generate the decoded video block.

10. The method of claim 1, wherein if the encoded video block uses intra prediction, the context selection for the context-based adaptive binary arithmetic coding used for one or more of the at least one flag is determined based on the larger dimension, width or height, of the block and/or direction of the intra prediction.

11. A decoder comprising:
at least one processor;
at least one memory coupled to the at least one processor, said at least one memory comprising instructions executable by the at least one processor, which cause the at least one processor to perform operations comprising:
obtaining an encoded video block having at least one flag;
parsing a flag of the at least one flag to determine if the flag is set to signal that a transform of a plurality of transforms is to be used to decode the encoded video block in both a horizontal direction and a vertical direction to generate a decoded video block; and
responsive to when the flag is determined to be set to signal that the transform is not to be used in both the horizontal direction and in the vertical direction when decoding, parsing another flag of the at least one flag to determine in which one of the horizontal direction or the vertical direction the transform is to be used to decode the encoded video block.

12. The decoder of claim 11, wherein the transform comprises one of two available alternative transforms, and wherein the at least one memory further comprises instructions which cause the at least one processor to perform parsing the flag to determine which one of the two available alternative transforms of the transform is to be used to decode the encoded video block based on parsing the flag.

13. The decoder of claim 12, wherein one of the two available alternative transforms is a Discrete Sine Transformation, DST-7, and the other of the two available alternative transforms is a Discrete Cosine Transformation, DCT-8 transform.

14. The decoder of claim 11,
wherein the flag is a second flag, the transform is a second transform, the another flag is a third flag, and the another transform is a third transform, and
before parsing the second flag to determine if the second flag is set to signal that the second transform is to be used to decode the encoded video block in both the horizontal direction and the vertical direction, further comprising:

parsing a first flag of the at least one flag to determine if the first flag is set to signal that a first transform of the plurality of transforms is to be used to decode the encoded video block in the horizontal direction and the vertical direction to generate the decoded video block; and
responsive to when the first flag is determined to be set to signal that the first transform is to be used to decode the encoded video block in both the horizontal direction and in the vertical direction,
decoding the encoded video block in the horizontal direction and the vertical direction using the first transform to generate a decoded video block;
wherein the parsing the second flag is performed responsive to when the first flag is determined to be set to signal that the first transform is not to be used to decode the encoded video block in both the horizontal direction and in the vertical direction.

15. The decoder of claim 11, wherein the transform comprises a DST-7 transform.

16. The decoder of claim 11, wherein the another transform comprises one of a DCT-2 transform or a DCT-8 transform.

17. The decoder of claim 11, wherein the encoded video block is decoded in one of the horizontal and vertical directions using the second transform and is decoded in the other one of the horizontal and vertical directions using the another transform.

18. A method performed by an encoder, the method comprising:
obtaining a video block for encoding;
determining a characteristic of the video block;
responsive to when the characteristic is determined to be a type that indicates a multiple transform selection is used:
selecting a first transform in a plurality of transforms that is part of the multiple transform selection;
testing combinations of the plurality of transforms in a horizontal direction and a vertical direction without testing a combination where the first transform is used in both the horizontal direction and the vertical direction;
selecting a combination from the combinations of the plurality of transforms that provides the lowest rate distortion;
encoding the video block using the selected combination to generate an encoded video block; and
responsive to when the characteristic is determined to be a type that indicates a multiple transform selection is not to be used:
encoding the video block using one transform in the horizontal direction and the vertical direction.

19. The method of claim 18, wherein selecting the first transform comprises selecting a transform that is similar to another transform of the plurality of transforms and is more computationally intensive for the at least one processor than the other transform of the plurality of transforms.

20. The method of claim 18, further comprising determining the plurality of transforms that are to be tested.

21. The method of claim 20, wherein the plurality of transforms comprises at least three of a Discrete Cosine Transformation, a DCT-2 transform, a DCT-8 transform, and a Discrete Sine Transformation, DST-7 transform.

22. The method of claim 18, wherein the characteristic of the video block comprises a dimension of the video block.

* * * * *

UNITED STATES PATENT AND TRADEMARK OFFICE
CERTIFICATE OF CORRECTION

PATENT NO. : 11,991,359 B2
APPLICATION NO. : 18/077414
DATED : May 21, 2024
INVENTOR(S) : Hollmann et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 1, Line 4, delete "ISOIIEC" and insert -- ISO/IEC --, therefor.

On Page 2, in Item (56), under "OTHER PUBLICATIONS", in Column 1, Line 8, delete "ISOIIEC" and insert -- ISO/IEC --, therefor.

On Page 2, in Item (56), under "OTHER PUBLICATIONS", in Column 2, Line 41, delete "JVET-K1002-2," and insert -- JVET-K1002-v2, --, therefor.

In the Specification

In Column 1, Line 9, delete "2021," and insert -- 2021, now U.S. Pat. No. 11,558,613, --, therefor.

In Column 2, Line 20, delete "parsed.lf" and insert -- parsed. If --, therefor.

In Column 7, Line 1, delete "(NV)" and insert -- (A/V) --, therefor.

In Column 13, Line 35, delete "al'," and insert -- a '1', --, therefor.

In Column 15, Line 67, delete "a 4×4." and insert -- 4×4. --, therefor.

Signed and Sealed this
Twenty-third Day of July, 2024

Katherine Kelly Vidal
*Director of the United States Patent and Trademark Office*